(12) United States Patent
Silver et al.

(10) Patent No.: US 7,532,884 B2
(45) Date of Patent: *May 12, 2009

(54) SYSTEM FOR AUTOMATIC SELECTION OF PROFILE BASED ON LOCATION

(75) Inventors: Edward Michael Silver, Atlanta, GA (US); Maria Adamczyk, Alpharetta, GA (US)

(73) Assignee: AT&T Intellectual Property I, L.P, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/610,967

(22) Filed: Dec. 14, 2006

(65) Prior Publication Data

US 2007/0082668 A1    Apr. 12, 2007

Related U.S. Application Data

(63) Continuation of application No. 10/206,684, filed on Jul. 26, 2002, now Pat. No. 7,162,237.

(51) Int. Cl.
*H04Q 7/20* (2006.01)

(52) U.S. Cl. .................... 455/432.3; 455/417; 455/445; 455/456.3; 455/457

(58) Field of Classification Search .............. 455/432.3, 455/461, 417, 414.1, 456.1–6, 457, 557, 455/556.1
See application file for complete search history.

(56) References Cited

U.S. PATENT DOCUMENTS

| | | | |
|---|---|---|---|
| 5,461,390 A | 10/1995 | Hoshen | |
| 5,742,905 A | 4/1998 | Pepe et al. | |
| 6,134,314 A | 10/2000 | Dougherty et al. | |
| 6,218,939 B1 | 4/2001 | Peper | |
| 6,320,534 B1 | 11/2001 | Goss | |
| 6,400,956 B1 | 6/2002 | Richton | |
| 6,405,261 B1 | 6/2002 | Gaucher | |
| 6,459,969 B1 | 10/2002 | Bates et al. | |
| 6,476,732 B1 | 11/2002 | Stephan | |
| 6,477,374 B1 | 11/2002 | Shaffer et al. | |
| 6,593,856 B1 | 7/2003 | Madau | |
| 2002/0111172 A1 | 8/2002 | DeWolf et al. | |
| 2002/0164979 A1 | 11/2002 | Mooney et al. | |

OTHER PUBLICATIONS

Zellner; U.S. Appl. No. 11/366,177, filed Mar. 2, 2006.
Zellner; U.S. Appl. No. 11/366,178, filed Mar. 2, 2006.
Zellner; U.S. Appl. No. 11/366,154, filed Mar. 2, 2006.
Silver; U.S. Appl. No. 10/206,684, filed Jul. 26, 2002.
Silver; Non- Final Rejection mailed Oct. 6, 2004; U.S. Appl. No. 10/206,684, filed Jul. 26, 2002.
Silver; Examiner Interview Summary Record mailed Feb. 7, 2005; U.S. Appl. No. 10/206,684, filed Jul. 26, 2002.
Silver; Final Rejection mailed Jun. 16, 2005; U.S. Appl. No. 10/206,684, filed Jul. 26, 2002.

(Continued)

*Primary Examiner*—Philip J Sobutka
(74) *Attorney, Agent, or Firm*—Woodcock Washburn LLP (57) ABSTRACT

Systems for automatically selecting a user's profile based on location include a device adapted to being tracked by location and a database that includes a user's preferences for routing calls. The user's calls are routed to the user based on the user's call routing preferences and the location of the device. Other systems and methods are also provided.

20 Claims, 8 Drawing Sheets

OTHER PUBLICATIONS

Silver; Examiner Interview Summary Record mailed Aug. 12, 2005; U.S. Appl. No. 10/206,684, filed Jul. 26, 2002.

Silver; Non- Final Rejection mailed Oct. 5, 2005; U.S. Appl. No. 10/206,684, filed Jul. 26, 2002.

Silver; Examiner Interview Summary Record mailed Nov. 28, 2005; U.S. Appl. No. 10/206,684, filed Jul. 26, 2002.

Silver; Non- Final Rejection mailed Mar. 26, 2006; U.S. Appl. No. 10/206,684, filed Jul. 26, 2002.

Silver; Examiner Interview Summary Record mailed Jun. 6, 2006; U.S. Appl. No. 10/206,684, filed Jul. 26, 2002.

Silver; Notice of Allowance and Fees Due mailed Sep. 19, 2006; U.S. Appl. No. 10/206,684, filed Jul. 26, 2002.

| 402 HOURS | 404 MARY SMITH'S LOCATION | 406 PREFERENCES FOR CALL ROUTING | 408 DESTINATION ADDRESS |
|---|---|---|---|
| 8AM-5PM | IN OFFICE | CALLS FROM BOSS TO WORK TELEPHONE | 010.80.80.123 |
| | IN OFFICE BUT AWAY FROM DESK | CALLS FROM BOSS TO WORK VOICE MAIL | 011.80.29.322 |
| | AWAY FROM OFFICE | CALLS FROM BOSS TO WIRELESS DEVICE | 022.80.32.344 |
| | AT HOME | CALLS FROM BOSS TO WORK VOICE MAIL | 011.80.29.322 |
| 5PM-10PM | AT HOME | CALLS FROM BOSS TO HOME TELEPHONE | 111.80.12.124 |
| 10PM-8AM | AT HOME | CALLS FROM BOSS TO WORK VOICE MAIL | 011.80.29.322 |

FIG. 5

| HOURS | MARY SMITH'S LOCATION | PREFERENCES FOR CALL ROUTING | DESTINATION ADDRESS |
|---|---|---|---|
| 8AM-5PM | IN OFFICE | CALLS FROM FAMILY TO WORK TELEPHONE | 010.80.80.123 |
|  | IN OFFICE BUT AWAY FROM DESK | CALLS FROM FAMILY TO WIRELESS DEVICE | 022.80.32.344 |
|  | AWAY FROM OFFICE | CALLS FROM FAMILY TO HOME TELEPHONE | 022.80.32.344 |
|  | AT HOME | CALLS FROM FAMILY TO HOME TELEPHONE | 011.80.29.322 |
| 5PM-10PM | AT HOME | CALLS FROM FAMILY TO HOME TELEPHONE | 111.80.12.124 |
| 10PM-8AM | AT HOME | CALLS FROM FAMILY TO WIRELESS DEVICE | 022.80.32.344 |

FIG. 7B

SYSTEM FOR AUTOMATIC SELECTION OF PROFILE BASED ON LOCATION

TECHNICAL FIELD

This application is a continuation of U.S. patent application Ser. No. 10/206,684, filed Jul. 26, 2002, which is incorporated by reference in its entirety.

BACKGROUND OF THE INVENTION

Communications services have evolved such that users can utilize multiple communications devices to receive telephone calls. For instance, a user can receive telephone calls via a wireline telephone, a wireless telephone, a personal data assistant (PDA), an internet protocol (IP) device, a pager, a personal computer, a laptop computer, and a watch, among others. In addition, a user can receive calls to several communications devices at the same time. For example, a user located at work can be using the office telephone transacting business, and simultaneously receive a call on his wireless telephone and pager. In this situation, the user's choices include, ignoring certain devices, allowing an answering service, such as voice mail, to answer certain calls, or putting selected devices on hold while answering others.

Another challenge of this environment involves call directing and screening. For instance, a user may wish to receive calls at one location from certain individuals, and not receive those calls even during the same time period, when the user is in a different location. By way of example, an employee who is willing to receive calls from his boss during working hours while at work, may be unwilling to answer those calls, even if during working hours, if the employee leaves work and goes home for the day.

Thus, a heretofore-unaddressed need exists for a solution that addresses the aforementioned deficiencies and inadequacies.

SUMMARY OF THE INVENTION

The preferred embodiments of the present invention provide systems and methods for an automatic selection of profile based on location.

Briefly described, in architecture, one preferred embodiment of the system, among others, can be implemented as follows. A system for an automatic selection of profile based on location comprises a device adapted such that the device's location is tracked, and a database having user preferences for routing calls based on the location of the device.

The preferred embodiment of the present invention can also be viewed as providing methods for automatically selecting profiles based on location. In this regard, one embodiment of such a method, among others, can be broadly summarized by the following steps: determining the location of a wireless device; obtaining a user's preferences in a database; and routing a telephone call to the user based on the user's preferences and the location of the wireless device.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for an automatic selection of profile based on location. To facilitate description of the inventive system, an example system that can be used to implement the systems and methods for an automatic selection of profile based on location is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide an automatic selection of profile based on location.

Figure 1:
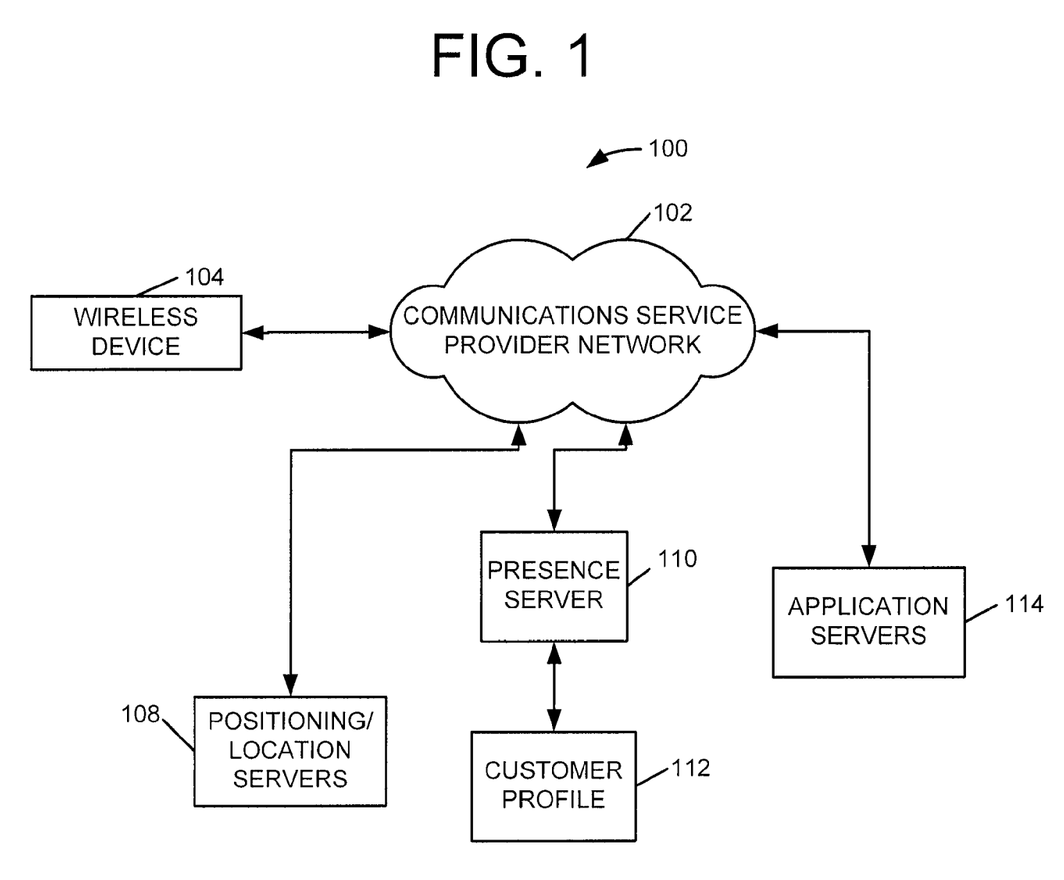
FIG. 1 is a block diagram depicting a preferred embodiment of an environment in which a system for automatic selection of profile based on location may be implemented.

Referring now in more detail to the drawings, in which like numerals indicate corresponding parts throughout the several views, FIG. 1 is a block diagram depicting a preferred embodiment of an environment 100 in which a system for automatic selection of profile based on location may be implemented. The preferred embodiment of the environment 100 includes a communications service provider network 102 and a wireless device 104 wirelessly coupled to the communications service provider network 102. The communications service provider network 102 may be any type of communication network employing any network topology, transmission medium, or network protocol. For example, such a network may be any public or private packet-switched or other data network, including the Internet, circuit-switched network, such as the public switched telecommunications network (PSTN), wireless network, or any other desired communications infrastructure and/or combination of infrastructures. In a preferred embodiment, the wireless device 104 includes but is not limited to, a wireless telephone, an internet protocol (IP) device, a laptop computer, a pager, a personal data assistant (PDA) or a watch, among others. In a preferred embodiment, the wireless device 104 includes a built in receiver and transmitter for tracking the location of the wireless device 104.

A location of the wireless device 104 can be determined by the elements in environment 100 shown in FIG. 1. Positioning/location processors 108, such as servers, provide the processing capabilities for storing the location information received from the wireless devices 104 that are coupled to the network. In one embodiment, the positioning/location servers 108 include functionality for determining the location of the wireless device 104. This functionality can a plurality of technology and methods for position determination, including for example a global positioning system (GPS), among others. A presence processor 110, such as a server, couples to the communications service provider network 102. The presence server 110 provides information, such as presence and availability data for a subscriber of the automatic selection of profile based on location system. A source of the presence and availability data is from the customer profile database 112. In one preferred embodiment, a user establishes priorities in the database on how to route calls to him or her. Examples of options that can be set by the user include routing calls based on caller, i.e., family member or work associate, time of day, or proximity of location tracking device 104 relative to a base location, among others. In a preferred embodiment, the customer profile database 112 includes customer defined preferences, also referred to as personas, for how to process certain telephone calls based on the location of the customer's wireless device 104. An application processor 114, such as a server couples to the communications service provider network 102 and includes logic that provides for automatic selection of profile based on location.

Figure 2:
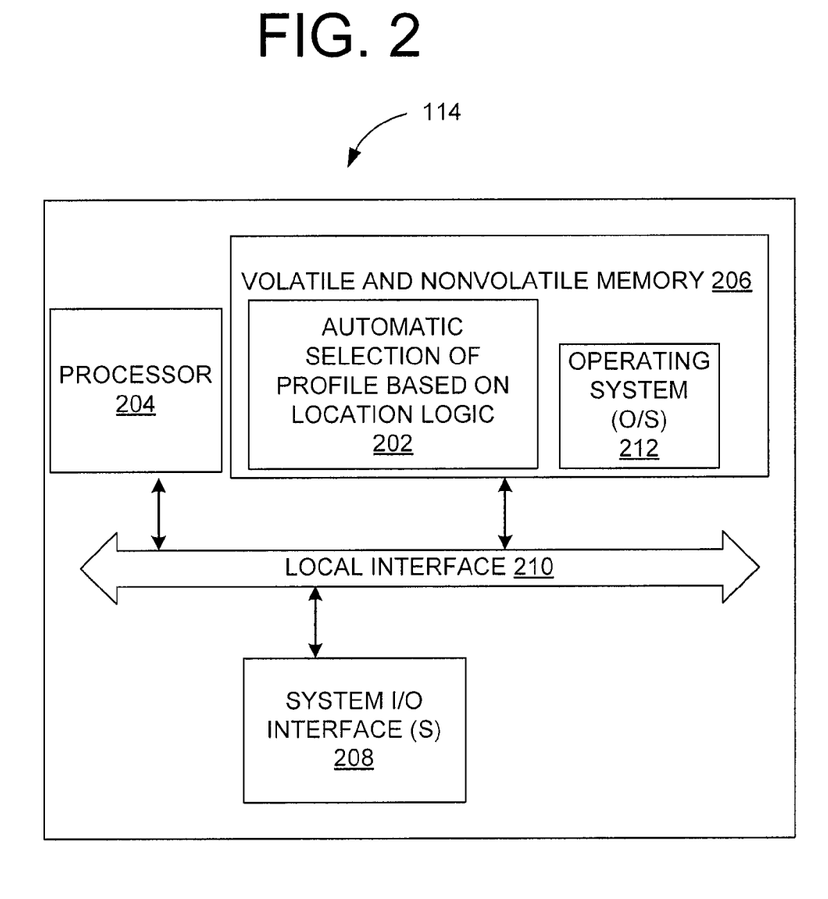
FIG. 2 is a block diagram depicting a preferred embodiment of an application server for implementing a system for an automatic selection of profile based on location.

FIG. 2 is a block diagram depicting a preferred embodiment of the application server 114 for implementing a system for an automatic selection of profile based on location. As shown in FIG. 2, automatic selection of profile based on location logic 202 can be implemented in software (e.g., programming stored on a medium, firmware, etc.), hardware, or a combination thereof. In the preferred embodiments, the logic 202 is implemented in software as an executable program, and is executed by a special or general purpose digital computer, such as a personal computer (PC; IBM-compatible, Apple-compatible, or otherwise), workstation, minicomputer, or mainframe computer.

Generally, in terms of hardware architecture, as shown in FIG. 2, the application processor 114 includes, inter alia, a processing device 204 and memory 206. Input and/or output (I/O) devices 208 (or peripherals) can be communicatively coupled to a local interface 210. The local interface 210 can be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

The processing device 204 is preferably a hardware device for executing software, particularly that stored in memory 206. The processing device 204 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 206 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processing device 204.

The software and/or firmware in memory 206 may include one or more separate programs, each of which comprises an ordered listing of executable instructions for implementing logical functions. In the example of FIG. 2, the software in the memory 206 includes logic 202 and a suitable operating system (O/S) 212. The operating system 212 essentially controls the execution of other computer programs, such as logic 202, and provides scheduling, input-output control, file and data management, memory management, and communication control and related services.

The logic 202 is preferably a source program, executable program (object code), script, or any other entity comprising a set of instructions to be performed. When the logic 202 is implemented as a source program, then the program needs to be translated via a compiler, assembler, interpreter, or the like, which may or may not be included within the memory 206, so as to operate properly in connection with the O/S 212. Furthermore, logic 202 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 208 may preferably include input devices, for example but not limited to, a keyboard, mouse, scanner, microphone, etc. Furthermore, the I/O devices 208 may also include output devices, for example but not limited to, a printer, display, etc. Finally, the I/O devices 208 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the logic 202 is implemented in software, as is shown in FIG. 2, it should be noted that the logic 202 can preferably be stored on any computer-readable medium for use by or in connection with any computer related system or method. The logic 202 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. If implemented in hardware, as in an alternative embodiment, the logic 202 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
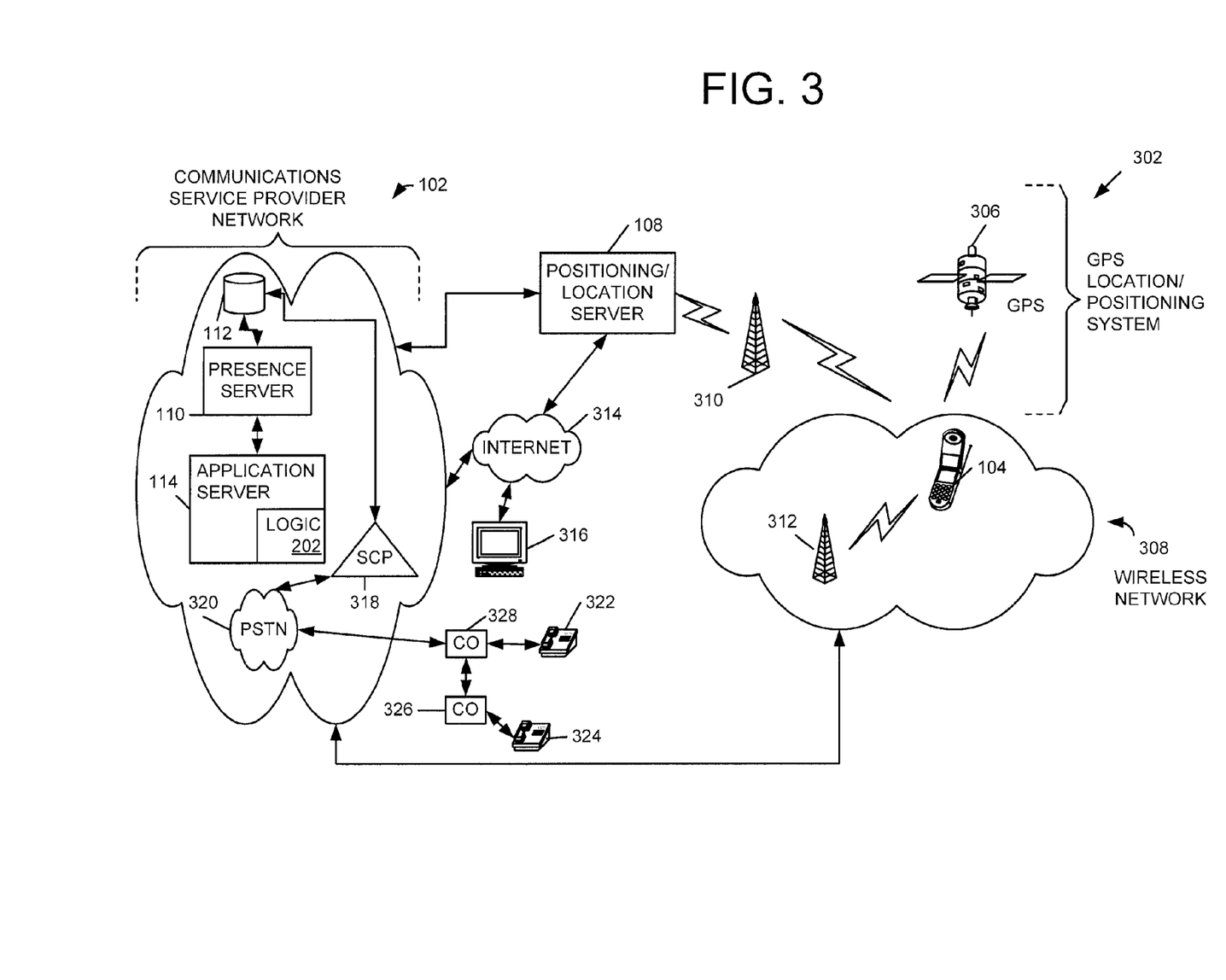
FIG. 3 is a block diagram depicting a preferred embodiment for implementing a system for automatic selection of profile based on location.

FIG. 3 is a block diagram depicting a preferred embodiment of a system for implementing a system for automatic selection of profile based on location. The system includes a GPS location/positioning system 302 and a wireless network 308 that are configured to communicate with the communications service provider network 102. The GPS location/positioning system 302 includes a GPS satellite 306, tower 310 (only one shown for simplicity with base stations also omitted for simplicity) and the positioning/location server 108. The wireless network 308 includes the wireless device 104 adapted to receive signals from tower 312 (only one shown for simplicity with additional base station and connections to PSTN 320 also omitted for simplicity) that support wireless telephone calls. Preferably, the wireless device 104 is further adapted to receive signals from the GPS location/positioning system 302. In one preferred embodiment, a position (or location) of the wireless device 104 is tracked utilizing the GPS location/positioning system 302. In another preferred embodiment, the position of the wireless device 104 is tracked utilizing the wireless network 308, alone or in combination with the GPS location/positioning system 302. The wireless device 104 is configured to transmit its location to tower 310 or 312, that then transmits the location of the wireless device 104 to the positioning/location server 108. In another preferred embodiment, multiple wireless devices 104 may be included in the system. In yet another preferred embodiment, wireless device 104 embodies a location determining device that may be a wired device, or any other processing device capable of having its position tracked.

In a preferred embodiment, the communications service provider network 102 includes but is not limited to, the application server 114 having logic, such as logic 202, presence server 110, customer profile database 112, a service control point (SCP) 381 and a public switched telephone network (PSTN) 320. In other embodiments, all shown elements are provided as part of the PSTN 320. The application server 114 is coupled to the presence server 110. In one preferred embodiment the communications service provider network 102 provides Internet 314 access. In another preferred embodiment, the communications service provider network 102 has Internet access incorporated within the communications service provider network 102. Providing Internet access allows users to add, change or modify their preferences in the customer profile database 112 from any location by using for instance, a personal computer 316. In another embodiment, a user changes his or her preferences in the customer profile database 112 using the wireless device 104 or wireline device 322, 324, among others, to dial into the application server 114.

In a preferred embodiment, the application server 114 retrieves location information on the wireless device 104 from the positioning/location server 108, and working in cooperation with the presence server 110. The presence server 110 includes information about the availability of the wireless device 104. In one embodiment, the availability information includes data such as whether the wireless device 104 is logged into application server 114. The presence server 110 also accesses the customer profile database 112 to obtain preference information, also known as personas, established by the user of the wireless device 104. In a preferred embodiment, the presence server 110 and the customer profile database 112 are separate elements and/or functions. In another preferred embodiment, the functions of the presence server 110 and the customer profile database 112 are combined into a single system.

The PSTN 320 provides communications connectivity for connecting telephones 322, 324 to each other and the Internet 314. Typically, a telephone 322, 324 connects to a nearby central office (CO) 326, 328 that includes equipment, facilities and personnel for routing calls from the telephone 322, 324 to the PSTN 320. In a preferred embodiment, the PSTN 320 is configured to implement an advanced intelligent network (AIN) that provides capabilities such as announcements, text-to-speech, and voice recognition. When configured as an AIN, the PSTN 320 can interrupt the normal call processing, and switch calls under the control of the SCP 318 to an address as determined by the user's preferences in the customer profile database 112 and the location of the wireless device 104. A call handled in this manner is then routed, as established by the user, to the designated device that can include the wireless device 104, personal computer 316, a specific voice mail account (not shown) or a wireline telephone 322, 344.

In one embodiment, the presence server 110 working in cooperation with the positioning/location server 108 includes previously stored proximity threshold information for the wireless device 104. For example, user can identify a base location, such that distances from the base location are tracked and can trigger changes in call routing based on user's preferences and the position of the wireless device 104 from the base location. For example, the user can designate a work location as the base location and thus, the wireless device 104 will be tracked based upon a distance from the user's work location. The positioning/location server 108 tracks the location of the wireless device 104. The base location identified by the application server 114 working in cooperation with the presence server 110, obtains the user's preferences and a call to the user is routed based on the caller identification information of the caller, the user's preferences, and position of the wireless device 104, etc.

Figure 4:
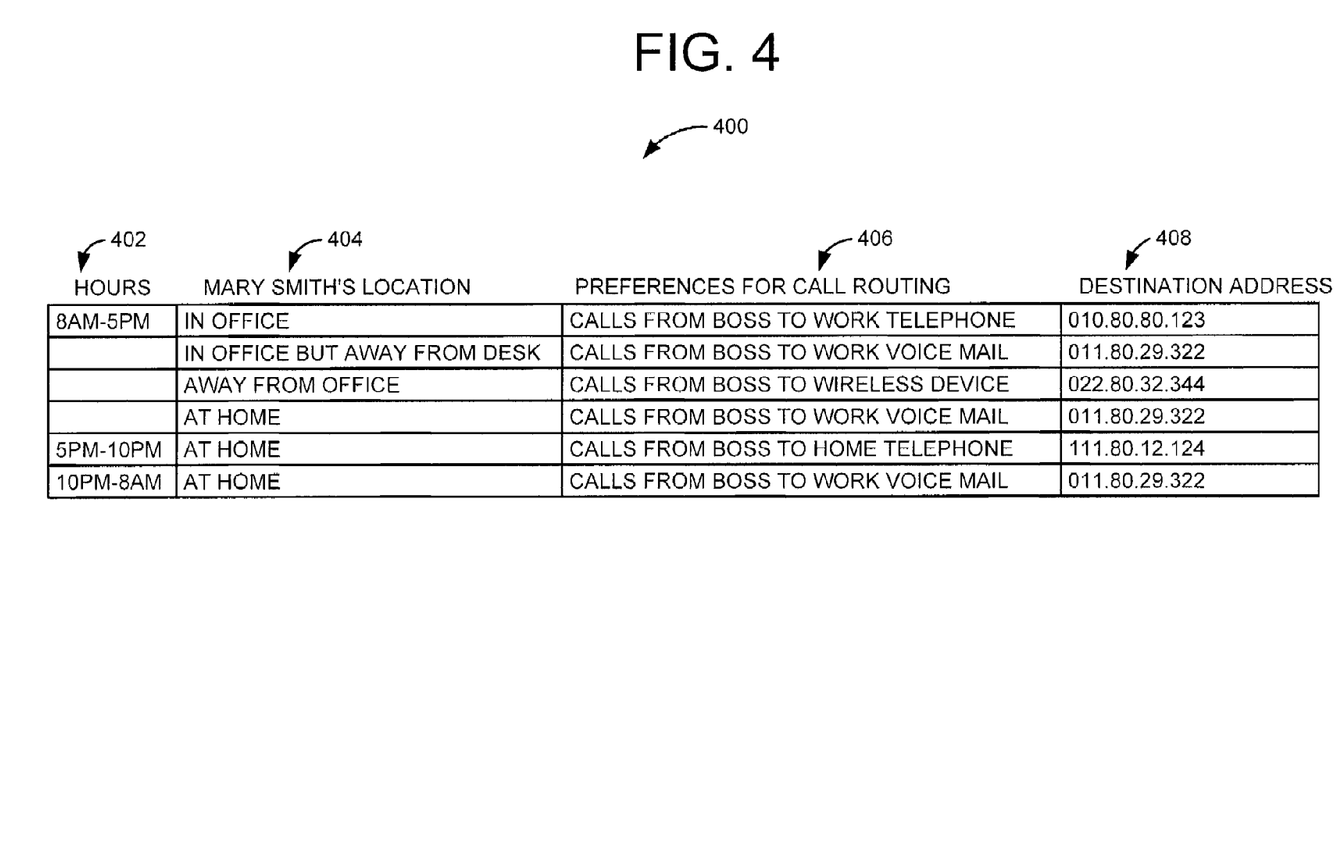
FIG. 4 is an illustrative example of a table depicting a preferred embodiment of a work persona included in a customer profile.

FIG. 4 is an illustrative example of a table 400 depicting a preferred embodiment of a work persona included in a customer profile 112. In the example shown in FIG. 4, the customer profile 112 is for user Mary Smith. In a preferred embodiment, the table 400 includes, but is not limited to, hours 402, locations 404, preferences for call routing 406, and destination addresses 408. The hours selected by Mary Smith include 8 a.m. to 5 p.m., 5 p.m. to 10 p.m., and 10 p.m. to 8 a.m. The invention is not limited to these time entries, and any desired time periods can be selected. The hours selected by Mary Smith coincide with her typical work day, i.e., 8 a.m. to 5 p.m., after work hours, i.e., 5 p.m. to 10 p.m., and sleeping and rising hours, i.e., 10 p.m. to 8 a.m.

During the hours of 8 a.m. to 5 p.m., Mary Smith is typically at work. However, Mary Smith may not always be available to receive telephone calls on her work telephone.

For example, Mary Smith can be in her office, in her office but away from her desk, away from the office, such as, at lunch or in a meeting, or at home, for instance, if she leaves early due to illness. Mary Smith has established preferences for routing calls based on the locations listed in the table 400. In this case, Mary Smith has selected her work location as the base location. The automatic selection based on profile system tracks the location of Mary Smith's wireless device 104 is proximity to her work location.

Mary Smith has established the following preferences for her work persona. If Mary Smith is in her office during work hours, she wishes calls from her boss to be routed to her work telephone. If Mary Smith is in her office but away from her desk during work hours, calls from her boss are routed to her work voice mail. If Mary Smith is away from the office during work hours, but not at home, calls from her boss are routed to her wireless device. In a preferred embodiment, the wireless device performs as the location determining device in one implementation of the system for automatic selection of location. If Mary Smith is at home during work hours, calls from her boss are routed to her work voice mail. After work hours but before Mary Smith retires for the evening, i.e., between 5 p.m. to 10 p.m., calls from her boss will be routed to her home telephone. From 10 p.m. to 8 a.m., calls from Mary Smith's boss will be routed to her work voice mail. All calls are routed using the destination address 408 for that particular device.

Figure 5:
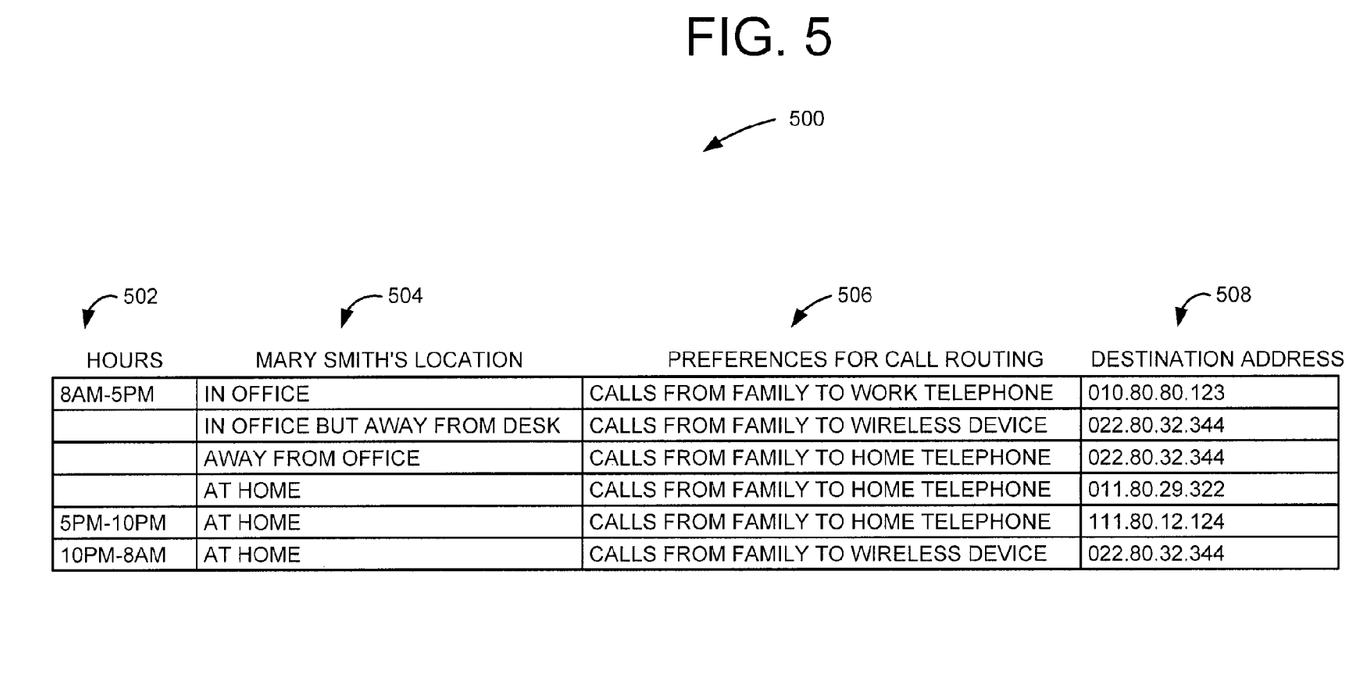
FIG. 5 is an illustrative example of a table depicting a preferred embodiment of a family persona included in a customer profile.

FIG. 5 is an illustrative example of a table 500 depicting a preferred embodiment of a family persona included in a customer profile 112. In one preferred embodiment, the system for automatic selection of location determines which persona to utilize, (i.e., work persona versus family persona) based upon alone or in combination, the user's base location, the position of the user's location tracking device 104, priorities established in the application server 114 and time of day. In another preferred embodiment, the persona is selected based upon who is calling the user, i.e., boss in FIG. 4 versus family member in FIG. 5.

In a preferred embodiment, the table 500 includes, but is not limited to, hours 502, locations 504, preferences for call routing 506 and destination addresses 508. The hours selected by Mary Smith include 8 a.m. to 5 p.m., 5 p.m. to 10 p.m., and 10 p.m. to 8 a.m. The invention is not limited to these time entries, and any desired time periods can be selected. The hours selected by Mary Smith coincide with her typical work day, i.e., 8 a.m. to 5 p.m., after work hours, i.e., 5 p.m. to 10 p.m., and sleeping and rising hours, i.e., 10 p.m. to 8 a.m. In this case, Mary Smith has selected her home location as the base location. The automatic selection based on profile system tracks the location of Mary Smith's wireless device 104 is proximity to her home location.

During the hours of 8 a.m. to 5 p.m., Mary Smith is typically at work. Mary Smith has established preferences for routing calls based on her home as the base location. If Mary Smith is in her office during work hours, she wishes calls from her family to be routed to her work telephone. If Mary Smith is in her office but away from her desk during work hours, calls from her family are routed to her wireless device. In a preferred embodiment, the wireless device performs as the location determining device in one implementation of the system for automatic selection of location. If Mary Smith is away from the office during work hours, calls from her family are routed to her wireless device. If Mary Smith is at home during work hours, calls from her family are routed to her home telephone. After work hours, but before Mary Smith retires for the evening, i.e., between 5 p.m. to 10 p.m., if she is at home, calls from her family are routed to her home telephone. From 10 p.m. to 8 a.m., if Mary Smith is at home, calls from her family are routed to her wireless device. All calls are routed using the destination addresses 508 for that particular device.

Figure 6:
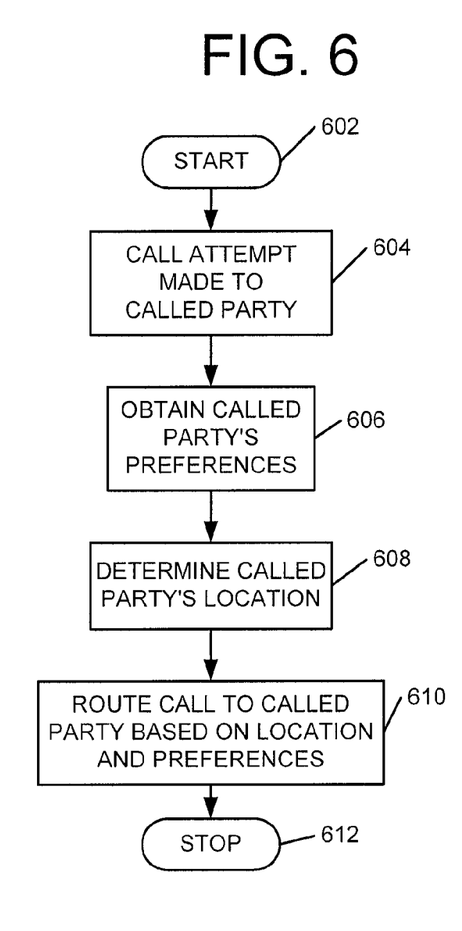
FIG. 6 is a flow chart depicting functionality of a preferred embodiment of an implementation of a system for automatic selection of profile based on location.

FIG. 6 is a flow chart 600 depicting general functionality (or method) of a preferred embodiment of an implementation of a system for automatic selection of profile based on location. The process begins at 602. At 604 a call attempt is made to a called party. For instance, Mary Smith's boss attempts to call her. At 606, the called party's preferences are obtained. In a preferred embodiment, the normal call routing for a call is interrupted and calling preferences are obtained. The presence server determines the availability of the called party based upon the called party's wireless device being logged into the application server and the called party's presence and availability defined by her active persona. The customer profile for the called party is obtained and returned to the application server.

At 608, the location of the called party is determined. The GPS location/positioning system is utilized to determine the location of the called party. The location of the wireless device is stored in the position/location server. Based on the location of the wireless device, the called party's preferences will be automatically selected based on the location of the wireless device. The location information along with the called party's preferences now residing in the application server will be utilized to determine how to route the call. At 610, the call is automatically routed to the called party based on the location of the wireless device and the called party's call routing preferences that were automatically selected from the customer's profile based on the location of the wireless device. The process ends at 612.

Figure 7A:
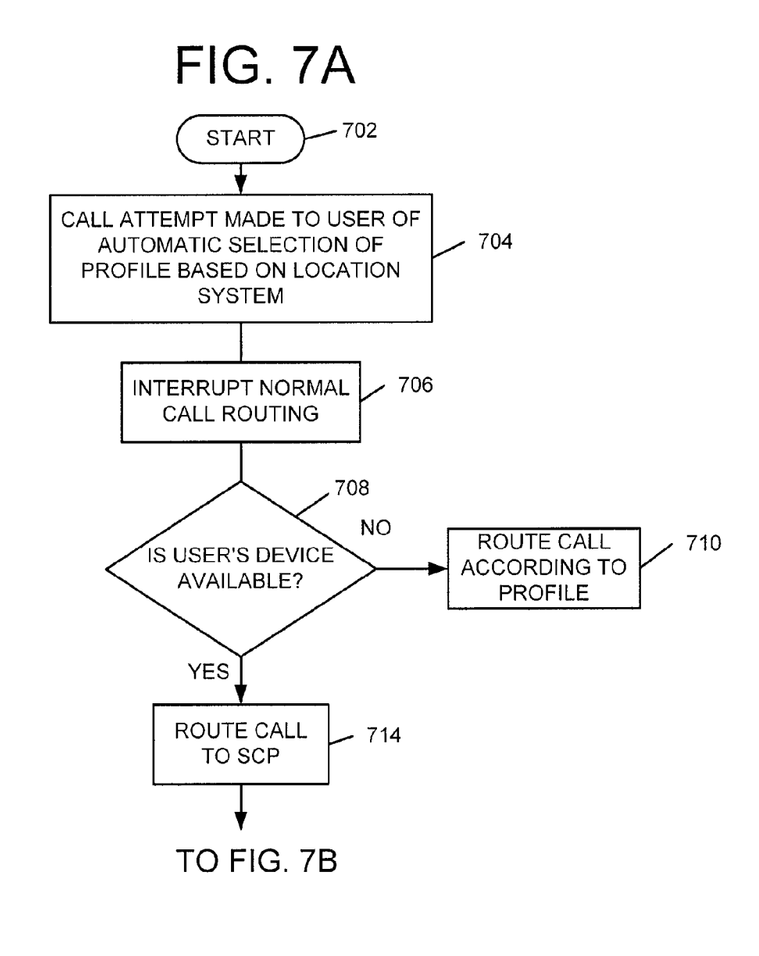
FIGS. 7A and 7B are flow charts depicting functionality of a preferred embodiment of a system for automatic selection of profile based on location.
Figure 7B:
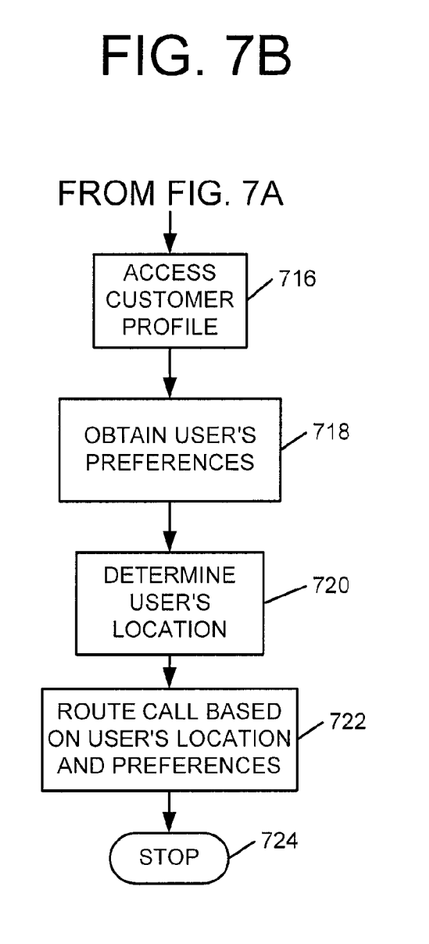

FIGS. 7A and 7B are flow charts depicting more specific functionality (or methods) of a preferred embodiment of an implementation of a system for automatic selection of profile based on location. Referring to FIG. 7A, the functionality (or method) may be construed as beginning at 702. At 704, a call attempt is made to a user who has subscribed to the automatic selection of profile based on location system. At 706, the normal call routing procedure is interrupted. In a preferred embodiment, the call attempt has routed from the calling party through the PSTN that is configured to implement an AIN that works in cooperation with the SCP to switch the call to an external IP or other address.

At 708, a determination is made as to whether or not the user's wireless device is available. In a preferred embodiment, this determination is performed by accessing a presence server. Upon logging into the automatic selection of profile based on location system, the user's wireless device's becomes available, and the wireless device's status is captured in the presence server. If the user's wireless device is not available, at 710, a default process routes the call as dialed. At 714, the interrupted call is routed to an SCP. The SCP is operative to switch the calls to an IP address identified in the user's customer profile.

Referring to FIG. 7B, at 716, the customer profile database is accessed. At 718, the user's preferences are obtained. In a preferred embodiment, the application server communicates with the presence server that is operatively coupled to the customer profile database, to obtain a persona that includes user preferences. The user's location is determined at 720. In a preferred embodiment, a GPS location/positioning system is utilized to obtain the location of the wireless device. In another preferred embodiment, the location of the user's wireless device is stored in a positioning/location server.

At 722, the call is routed based on the current location of the wireless device (and thus, the user) and preferences in the customer profile database. In a preferred embodiment, the application server is equipped with the user's preferences based on the particular time and location, including the user's base location. This information is communicated to the SCP, which interrupts normal call processing, and routes the call to the proper destination based on the user's preferences and the location of the wireless device. The process ends at 724.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system for an automatic selection of profile based on location, comprising:
    a server adapted to receive location information from a device adapted to being tracked by location; and
    a database external from the device having user preferences for routing calls based on the location of the device,
    wherein the server is adapted to determine if a wireless phone of a wireless number in the database is active on the network, interrupt call processing, and to switch the call to a call termination location identified in the database based upon the location of the device.

2. The system of claim 1, further comprising a communications network operatively coupled to the device, the communications network adapted to track the location of the device.

3. The system of claim 2, wherein the communications network further comprises a GPS location/positioning system.

4. The system of claim 3, wherein the GPS location/positioning system further comprises a position/location processor for storing location information obtained on the device.

5. The system of claim 2, wherein the communications network is adapted to interrupt call processing and to switch the call to a destination identified in the database based upon the location of the device.

6. The system of claim 1, wherein the database further comprises a customer profile database.

7. The system of claim 6, wherein the customer profile database further comprises at least one of hours, days, locations, user's preferences for call routing or destination addresses.

8. The system of claim 1, further comprising a presence processor adapted to communicate presence information on the device.

9. The system of claim 8, further comprising an application processor operatively coupled to the presence processor, the application processor adapted to provide logic for automatically selecting the information from the database for routing calls to a user based on where the device is located.

10. The system of claim 1, wherein the device further comprises at least one of a wireless telephone, a personal data assistant (PDA), a laptop computer, a pager, an internet protocol (IP) device or a watch.

11. The system of claim 1, further comprising a processor for selecting the user's call routing preference based on a position of the device.

12. The system of claim 1, further comprising a communications network for routing a call to a destination based on the user's call routing preferences in the database and the position of the device.

13. The system of claim 12, wherein the communications network further comprises a public switched telecommunications network (PSTN), the PSTN is adapted to provide an advanced intelligent network (AIN), the AIN is operative to switch calls to a service control point (SCP), and the SCP is adapted to switch the calls to the destination identified in the user's call routing preferences based upon the location of the device.

14. A system for an automatic selection of profile based on location, comprising:
    means for tracking a wireless device;
    means for obtaining a user's call routing preferences from a database external from the means for tracking the wireless device based upon a location of the wireless device;
    means for determining if a wireless phone of a wireless number in the database is active on the network; and
    means for interrupting call processing and for switching the call to a call termination location identified in the database based upon the location of the wireless device.

15. The system of claim 14, further comprising means for determining the location of the wireless device.

16. The system of claim 14, further comprising means for routing a telephone call to the user based on the user's call routing preferences and the location of the wireless device.

17. A method for an automatic selection of profile based on location, comprising:
    determining the location of a wireless device;
    obtaining a user's preferences in a database external from the wireless device;
    determining if a wireless phone of a wireless number in the database is active on the network;
    interrupting call processing; and
    switching a telephone call to a call termination location identified in the database based on the user's preferences and the location of the wireless device.

18. The method of claim 17, further comprising providing a presence indication for the wireless device.

19. The method of claim 17, further comprising tracking the location of the wireless device.

20. The method of claim 17, wherein the routing a telephone call to the user based on the user's preferences and the location of the wireless device further comprises interrupting call processing for the telephone call and routing the telephone call to a destination based upon the user's preferences in the database and the location of the wireless device.

* * * * *